(12) United States Patent
Reitmeier et al.

(10) Patent No.: US 10,542,305 B2
(45) Date of Patent: Jan. 21, 2020

(54) FLEXIBLE BROADCAST SYSTEM AND METHOD

(71) Applicant: NBCUniversal Media, LLC, New York, NY (US)

(72) Inventors: Glenn A. Reitmeier, Yardley, PA (US); Rajan Mehta, Stamford, CT (US); Harold Douglas Lung, Honomu, HI (US); Sheau Ng, Wayland, MA (US)

(73) Assignee: NBCUniversal Media, LLC, New York, NY (US)

( * ) Notice: Subject to any disclaimer, the term of this patent is extended or adjusted under 35 U.S.C. 154(b) by 960 days.

(21) Appl. No.: 13/692,547

(22) Filed: Dec. 3, 2012

(65) Prior Publication Data

US 2014/0157347 A1 Jun. 5, 2014

(51) Int. Cl.
*H04N 21/2385* (2011.01)
*H04N 21/262* (2011.01)

(52) U.S. Cl.
CPC .............................. *H04N 21/2385* (2013.01)

(58) Field of Classification Search
CPC ............ H04N 21/262; H04N 21/2393; H04N 21/2385; H04N 21/239; H04L 12/2801
USPC ......................................................... 725/126
See application file for complete search history.

(56) References Cited

U.S. PATENT DOCUMENTS

| | | | | |
|---|---|---|---|---|
| 6,868,255 B1 * | 3/2005 | Chanteau | ............ | H04N 7/17309 348/E7.07 |
| 7,441,014 B1 * | 10/2008 | Bulkowski | ............. | H04H 20/28 348/E7.054 |
| 7,945,688 B1 * | 5/2011 | Lango | ................... | H04L 65/605 709/203 |
| 2003/0092376 A1 * | 5/2003 | Syed | .................. | G06K 13/0825 455/3.06 |
| 2003/0112883 A1 * | 6/2003 | Ihrie | ...................... | H04H 20/30 375/260 |
| 2003/0215780 A1 * | 11/2003 | Saar | ......................... | G09B 7/02 434/351 |
| 2005/0043020 A1 * | 2/2005 | Lipsanen | ........... | H04N 7/17318 455/422.1 |
| 2005/0170798 A1 * | 8/2005 | Maalismaa | .......... | H04B 1/3805 455/168.1 |

(Continued)

OTHER PUBLICATIONS

Moon, Sang-Chul, (WO2010/067983) Method of Transmitting and Receiving a Signal and Apparatus for Transmitting and Receiving a Signal, Dec. 3, 2009, ip.com Translation.*

*Primary Examiner* — Nathan J Flynn
*Assistant Examiner* — Caroline Somera
(74) *Attorney, Agent, or Firm* — Fletcher Yoder, P.C.

(57) ABSTRACT

Broadcasts over designated bands of the radiofrequency spectrum allow for flexible use of the spectrum as well as for the receipt of return signals from receivers. To obtain return signals, information indicating one or more return channels and/or one or more return time windows may be sent with the broadcast transmission. The broadcast transmission may be made over UHF bands, with the return signals being made over VHF bands. Spectrum may be utilized more efficiently by transmitting one or more beacon signals that define parameters for the broadcast transmission. Receivers may be adapted to decode the data of the beacon signals and rapidly tune to the broadcast transmission.

24 Claims, 3 Drawing Sheets

(56) References Cited

U.S. PATENT DOCUMENTS

| | | | | | |
|---|---|---|---|---|---|
| 2005/0232223 | A1* | 10/2005 | Muller | .................. | H04H 20/02 370/350 |
| 2006/0015580 | A1* | 1/2006 | Gabriel | .............. | H04N 7/17309 709/219 |
| 2006/0030318 | A1* | 2/2006 | Moore | .................. | H04W 48/10 455/434 |
| 2008/0002784 | A1* | 1/2008 | Kluesing | ........... | H04L 25/03834 375/295 |
| 2008/0051099 | A1* | 2/2008 | Moore | .................. | H04W 48/10 455/454 |
| 2009/0079580 | A1* | 3/2009 | Kaplan | .............. | G08B 21/0227 340/686.6 |
| 2009/0103649 | A1* | 4/2009 | Vare | ...................... | H04L 5/0064 375/295 |
| 2010/0194622 | A1* | 8/2010 | Clingman | .............. | G01S 13/765 342/37 |
| 2010/0234040 | A1* | 9/2010 | Palanki | ............... | H04W 52/244 455/452.2 |
| 2011/0177774 | A1* | 7/2011 | Gupta | .................... | H04H 20/93 455/3.06 |
| 2011/0179452 | A1* | 7/2011 | Dunker | ............. | G06F 17/30056 725/53 |
| 2011/0195667 | A1* | 8/2011 | Hassan | ................... | H04W 4/00 455/62 |
| 2012/0124605 | A1* | 5/2012 | Praden | .................. | H04H 60/31 725/14 |
| 2012/0171978 | A1* | 7/2012 | Sharma | ................ | H04B 1/1638 455/230 |
| 2012/0314790 | A1* | 12/2012 | Stadelmeier | .......... | H04L 5/0092 375/267 |
| 2013/0028335 | A1* | 1/2013 | Limberg | .............. | H04L 1/0071 375/240.27 |
| 2013/0204972 | A1* | 8/2013 | Russell | .................. | H04W 4/02 709/217 |
| 2013/0311669 | A1* | 11/2013 | Reimers | ................ | H04H 20/42 709/231 |
| 2014/0153503 | A1* | 6/2014 | Srinivasan | ......... | H04W 72/082 370/329 |

* cited by examiner

FLEXIBLE BROADCAST SYSTEM AND METHOD

BACKGROUND

The invention relates generally to the field of broadcast technologies, and more particularly to novel techniques for utilizing available spectrum and bandwidth to improve features offered to audiences.

Conventional "over the air", terrestrial broadcasting technologies have existed for many years, and have been improved and refined to their present state by successive waves of innovation. In general, utilizing agreed-upon broadcast protocols, transmitters send encoded data that may be repeated, amplified, and eventually sent over dedicated portions of the electromagnetic spectrum to receivers. The receivers, typically televisions and so-called "set top boxes" receive and decode the data for viewing, listing, recording, and so forth. Such technologies have been supplemented by cable transmissions, satellite transmissions, Internet transmissions, and so forth. Broadcast media still, however, holds a very important place in the range of options available for entertainment and information dissemination.

One disadvantage in current terrestrial broadcast technologies is the inability to offer more sophisticated paradigms for entertainment and information due to the lack of return channels. In certain new technologies, such return channels allow for the receiver to communicate with the transmitter, allowing for highly interactive experiences. These return channels are common for Internet communications, of course, owing to the 2-way nature of Internet communications. However, terrestrial broadcast is a fixed, 6 MHz one-way digital broadcast technology. Heretofore, new digital communication technologies, such as so-called "cognitive radio", cannot be used in current broadcast because of the lack of return channel from the receiver to the transmitter. Moreover, the use of spectrum for terrestrial video broadcast services such as television is not as efficient as it can be. As the need for radio spectrum rises greatly, the need for more efficient technology is needed.

Another drawback in traditional terrestrial broadcast stems from the natural limits of available spectrum. Traditional communications devices rely upon building the "rules" for spectrum use into the design of receiving devices. For example, in the United States, television receivers are designed to receive 6 MHz wide signals, using the NTSC analog or ATSC 8-VSB modulation specified by the FCC, occupying frequencies designated to broadcasters by the FCC (i.e., channel number) in a specific channel within a specific band of the RF spectrum (i.e., VHF channels 2-13; UHF channels 14-51). Thus, television receivers can tune across the band and receive various station signals precisely located at predisignated channels, but they have little or no capability to adapt to changing spectrum use. While such hardware based receiver designs allow for very low cost receivers, the current level of receiver design overconstrains flexible use of spectrum.

On the other extreme, much early development work has been done on software defined radio and cognitive radio. In general, software based signal demodulation requires costly very-wideband analog to digital conversion and a large amount of expensive computational power. In many approaches, the spectrum is scanned and analyzed and appropriate demodulation code applied to receive a particular signal. This necessitates frequent rescans. As any consumer who starts a television "setup scan" knows, this is a time consuming process and it is not conducive to responsive channel changes.

BRIEF DESCRIPTION

The invention provides innovations in the use of broadcast bandwidth and spectrum designed to respond to such drawbacks. In accordance with certain aspects, a broadcast technique comprises transmitting a broadcast signal over a desired radiofrequency band, the broadcast signal comprising data indicative of one or more radiofrequency return channels, and receiving from a receiver a return signal over the one or more return channels.

In accordance with another aspect, the invention provides a broadcast technique that comprises transmitting a broadcast signal over a desired UHF radiofrequency band, and receiving from a receiver a return signal over a different radiofrequency band.

In accordance with yet another aspect, the invention provides a broadcast technique that comprises transmitting a broadcast signal over a desired radiofrequency band, the broadcast signal comprising data indicative of one or more time windows for transmission of the return signal, and receiving from a receiver a return signal transmitted in the one or more time windows over a radiofrequency band.

In accordance with still another aspect, the invention provides a broadcast technique that comprises transmitting a broadcast signal over a desired radiofrequency band, and transmitting a beacon signal that identifies one or more parameters of the broadcast signal transmission.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
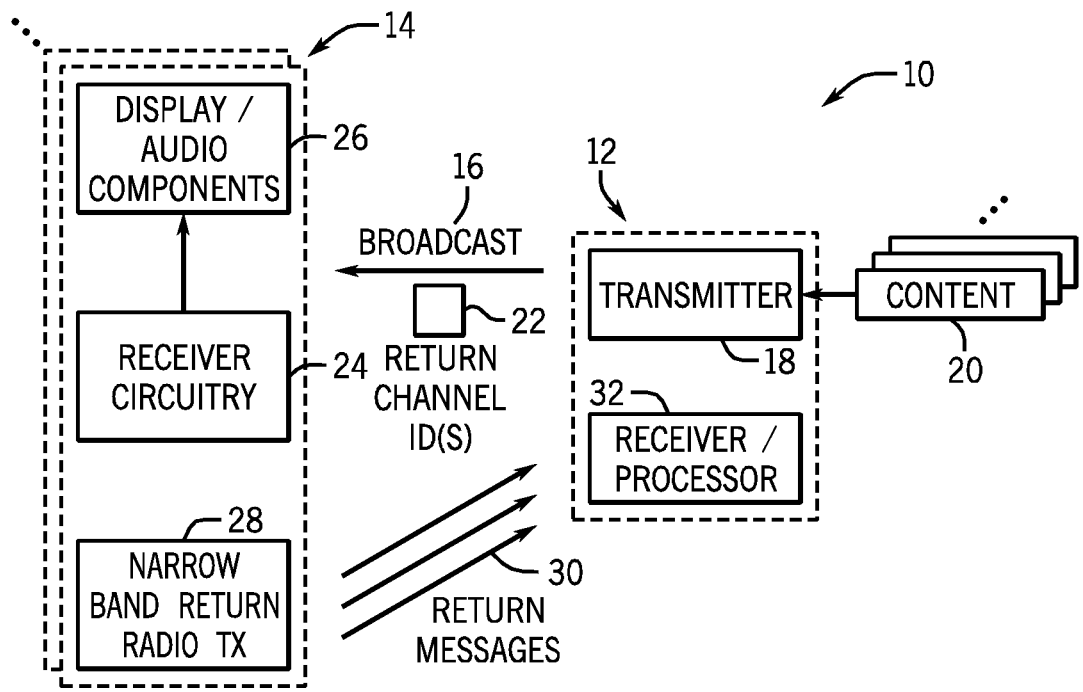
FIG. 1 is a diagrammatical representation of a broadcast system adapted to enable return messages from receivers in accordance with a first embodiment.

Turning to the drawings, FIG. 1 is a diagrammatical representation of a broadcast system 10 comprising one or more broadcasters 12 and an audience of receivers 14. In the most general form, the digital signal is broadcast, as indicated generally by reference numeral 16. The broadcaster may in most respects be identical to conventional broadcast technologies, and includes a transmitter 18, adapted to encode and transmit content 20. The transmissions may use conventional or adapted broadcast protocols, and allocated portions of the RF spectrum. In many practical applications, the broadcasts will be made based on a pre-defined schedule, although considerable flexibility in scheduling of broadcasts may be employed.

To accommodate communications back from the receivers, however, one or more strings of code are transmitted in the broadcast that identify one or more return channels, as indicated by reference numeral 22. For example, an identifier may be included in the broadcast signal, which identifies a group of return channels that are associated with that particular broadcast signal. In cases where the number of receivers exceed the number return channels slots, channel sharing technology used in data communication network (ALOHA, CDMA, etc.) can be used.

The receivers, which may include television sets, set-top boxes, radios, or any other device capable of receiving and processing the broadcasts include receiver circuitry 24, as well as display/audio components, such as a screen or display, and speakers (depending, of course, on the nature of the device and the broadcast). However, the receiver circuitry is adapted to identify and decode the return channel identification(s) of the broadcast. This channel information is passed to a return radio transmitter 28, which may be a narrow band transmitter. The device may be made interactive, such that messages, communications, responses, and, more generally, any desired data may be transmitted in the form of messages 30 back to the broadcaster. Moreover, time multiplexed technologies may be employed in addition to any combination of frequency use such as those discussed in the present disclosure. These return messages are then received and processed by a receiver/processor 32 of the broadcaster. It should be noted, however, that the return messages, more generally, could be sent to any desired recipient via the designated return channel(s). Moreover, other techniques such as spread spectrum with each channel assigned a unique pseudo random modulation key can also be used. Other aggregated narrowband digital modulation schemes, such as multi-carrier OFDM can also be used.

Figure 2:
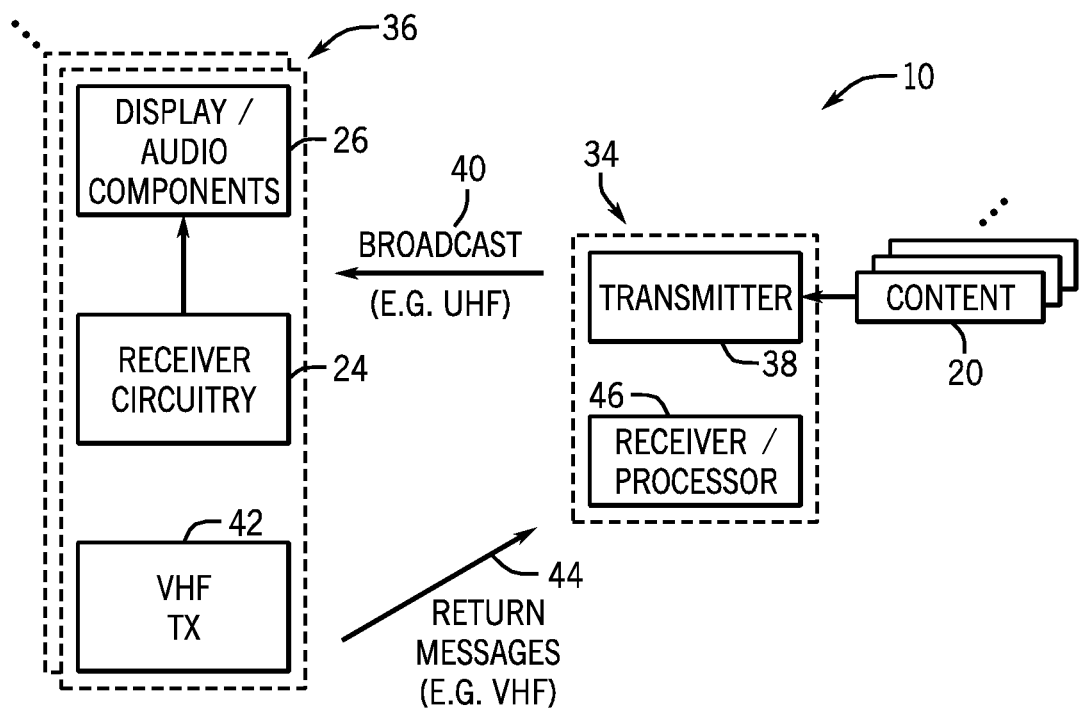
FIG. 2 is a diagrammatical representation of a broadcast system adapted to enable return messages from receivers in accordance with an alternative embodiment.

FIG. 2 illustrates an alternative embodiment in which a broadcaster 34 exchanges signals with receivers 36 that tune to a transmitter 38 to receive broadcasts 40. However, in this embodiment, the broadcasts are carried out over UHF bands, which comprise shorter wavelength, less prone to impairment for broadcast applications. The receiver circuitry 24 is adapted to receive these broadcasts, and the receivers 36 comprise a transmitter 42 that transmits over a different frequency band. This transmitter can prepare and send data over one or more return channels that occupy one or more frequency bands, longer wavelengths, more suited for point-to-point radio communication. Here the broadcaster comprises a receiver/processor 46 adapted to receive and process the signals transmitted by the receivers. The use of VHF signals may be advantageous for the return signals, particularly in the case of fixed service (e.g., roof antennae) portions of a broadcast. A UHF and VHF could be "bonded" to form a single capacity pool, or, for example, a UHD signals may be carried on a VHF signal while mobile HD is carried on a UHF signal. The UHD bitstream may be either a "standalone" or an "enhanced" layer.

Figure 3:
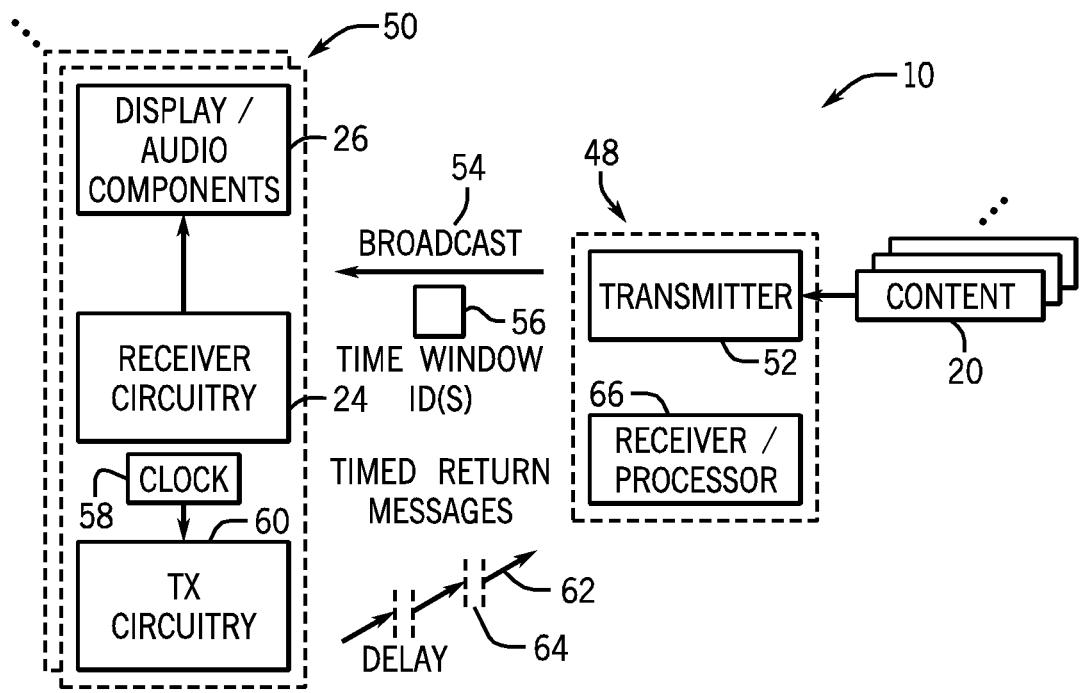
FIG. 3 is a diagrammatical representation of a broadcast system adapted to enable return messages from receivers in accordance with a further embodiment.

FIG. 3 is similar diagrammatical representation of another embodiment in which a broadcaster 48 exchanges signals with receivers 50. Here, the transmitter 52 is adapted to provide broadcast signals 54 that include code strings identifying one or more windows for receiving return signals from the receivers, as indicated generally by reference numeral 56. This identification code indicates time-based "call during this time window" data to further facilitate the sharing of the return channel resources by the receivers.

Each receiver includes an internal clock 58 (which may be synchronized with the broadcaster or any third party system, such as the GPS), as well as transmission circuitry 60 that can transmit signals 62 on the return channel at a time specified, with a random but limited delay 64 to avoid collision of messages on the return channel.

It should be noted that although represented and discussed separately, the techniques described above may be used together, where desired. In some systems, the techniques may complement one another for improved use of the return channels. In other systems, multiple techniques may be employed to accommodate different receiver designs and capabilities. By controlling two sets of data, the broadcasters can more effectively manage the return channels it expects for a particular broadcast signal.

It is presently envisioned that the return channels may be used primarily for non-realtime feedback data from the receivers to the broadcaster. For instance, viewing/usage data, signal quality, as well as application-specific data may be good candidates for such uses. The call-back time window may be used to effectively control the time delay in receiving any response. As a result, near-realtime applications such as game show polling can also be supported via the return channels. The techniques thus enable certain functionality similar to cognitive radio solutions, but that dynamically use spectrum that the device (e.g., cellular telephones) are not then using, and that are not being used by other applications. However, while such communication is via a one-to-one "full duplex" link, the current invention provides a novel broadcast service technology, primarily aimed for high bandwidth video services such as broadcast television. Moreover, it should be noted that a spectrum or time slice may be used for unicast downstream (e.g., via a cellular network overlay). Aggregated individual device messages in a single shared broadcast resource may become a drain on capacity, and such techniques may assist in addressing these issues.

Figure 4:
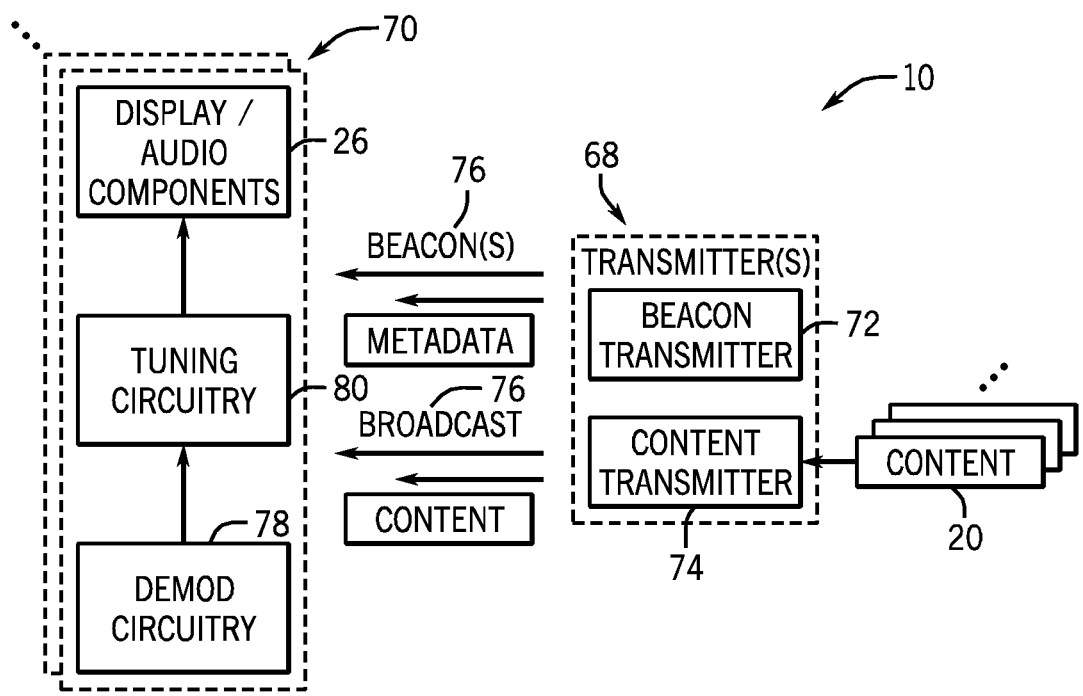
FIG. 4 is a diagrammatical representation of a broadcast system adapted to allow for flexible and dynamic use of available spectrum.

The invention also provides solutions allowing the flexible use of available spectrum that may further enhance the audience experience in ways currently unavailable with broadcast communications. FIG. 4 is a diagrammatical representation of an exemplary system in which a broadcaster 68 provides broadcasts to an audience of receivers 70. In this embodiment, the broadcaster comprises a beacon transmitter 72 as well as a content transmitter 74. The content transmitter may provide content 20 in a generally conventional manner, but with improved use of available spectrum.

The basic concept is to deploy a low-density, narrowband digital "beacon" signal 76 at one or more standardized frequencies. The beacon signal carries spectrum use metadata that informs a receiver what signals are present in a band and their specific parameters, such as center frequency, bandwidth, modulation type, source identification, and so forth. The broadcast also includes the content broadcast as before. The receivers comprise demodulation circuitry 78 that can receive and process the metadata of the beacon signals. Tuning circuitry 80 is adapted to act on the processed data to appropriately to tune to the broadcast signals without burdensome spectrum scans. The technique also allows transmitters to be added or modified in an area without complete disruption of legacy receivers. As will be apparent to those skilled in the art, the receivers may contain multiple and flexible demodulation designs.

In one preferred embodiment, a 100 khz digital signal is broadcast using QPSK modulation and a 7/8 error correcting code. This combination provides 1.2 bits/Hz, resulting in a net data rate of 1200 kbps. The transmitted data can be organized into UDP/IP packets, which are commonly used for one-way data transmission over IP networks. Further, the transmission can convey to receivers an RF spectrum metadata file, where a set of descriptors in a syntax such as XML can be used to describe the center frequency, bandwidth, modulation type and other parameters that would allow flexible receivers to rapidly determine the characteristics needed to rapidly tune and demodulate a variety of signals over a swath of RF spectrum. For example, modulation types could usefully include BPSK, QPSK, 16- 32- 64- 128- and 256-QAM, 8-VSB, COFDM and others. Bandwidth could usefully be any multiple of a common frequency such as 10 kHz (or the 180 kHz resource blocks used in LTE), or should at least include the ability to describe the 6, 7 and 8 MHz channelizations commonly used for television and the 1.4, 3, 5, 10, 15 and 20 MHz channelizations used for wireless telecom, including both uplink and downlink parameters. Center frequencies could usefully cover the entire UHF band. Moreover, it should be noted that non-contiguous blocks of channels may be used to allow for channel-bonding technologies. For example, two non-adjacent 6 MHz channels can form a 12 mHz bonded "channel". Additional metadata might describe such information as the location of transmitters.

Figure 5:
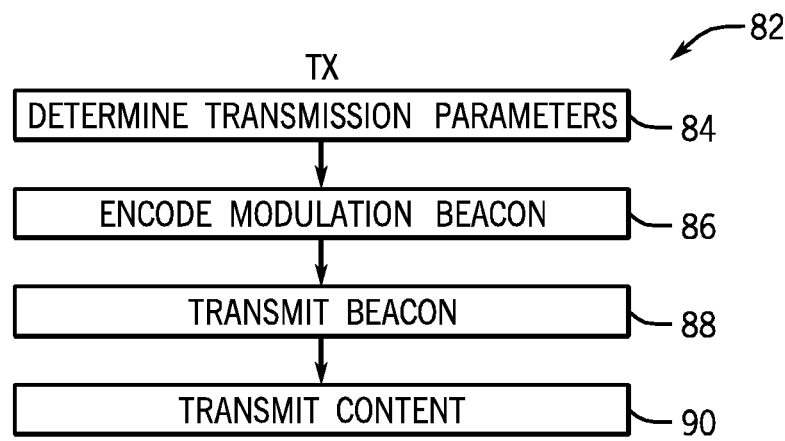
FIGS. 5 and 6 are flowcharts illustrating exemplary logic for flexible and dynamic use of spectrum in a system such as that illustrated in FIG. 4.
Figure 6:
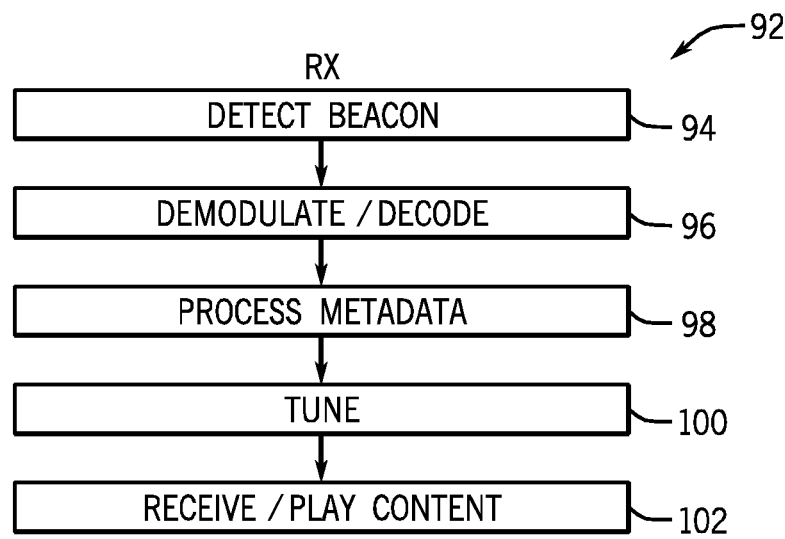

FIGS. 5 and 6 illustrate exemplary logic for carrying out the broadcast and receipt of signals in accordance with this aspect of the invention. The broadcast logic 82 includes determining desired transmission parameters that will be encoded in the metadata, as indicated at step 84. Such parameters may be determined and maintained for long periods of time, or frequent changes may be made, depending upon such factors as the content and broadcast schedule, the anticipated availability of the spectrum, the density and needs of other transmitters, and so forth. At step 86, then, this data is encoded for transmission, and at step 88 the beacon signals are transmitted containing the metadata. It should be noted that the beacon signals can serve multiple broadcasters. In fact, there may typically be a single beacon signal, transmitted at a pre-defined frequency, so that the receivers can automatically pick up the beacon signal to obtain a "current program guide" or channel-to-bandwidth mapping from the metadata carried by the beacon signal. In parallel, the content is transmitted, as indicated at step 90. The receiver logic 92 reflects the transmission logic in many respects. That is, at step 94 the beacon signals are received, and at step 96 these are demodulated and decoded to access the underlying data. The metadata is then processed, as indicated at step 98. Based upon the parameters contained in the metadata, the receiver may be tuned or otherwise adapted, as indicated at step 100. Once tuned, the receiver may receive and playback received content.

Here again, it should be noted that although each broadcaster may maintain its own beacon, a more efficient manner for implementing the technique may be to aggregate transmission parameters of the broadcasters (e.g., at step 84) into a single beacon. Various techniques may be envisioned for coordinating between broadcasters for scheduling and apportioning the use of the available spectrum, possibly in a highly dynamic way (e.g., periodic or occasional changes, via aution, and so forth). Innovative business models may be designed around such apportionment, as discussed below. Moreover, the receivers will typically remain tuned to the beacon in order to remain abreast of the transmission parameter changes as they occur. For instance, receivers tuned in 30 minutes before a particular sports event may find that the broadcaster is using only a 6 MHz band, and that at the start time of the game, or shortly before, the channel is to switch to a 24 MHz band (e.g., channel bonding over 46 MHz bands).

This aspect of the invention provides a simple and cost-effective approach to increasing the flexibility of spectrum use without the cost and complexities of a full software defined radio approach. A UHF receiving device would first "bootstrap" itself by detecting the beacon signal, demodulating and decoding it. The received metadata can thus be used to further direct rapid and cost-effective tuning of signals in the UHF band. Those skilled in the art will also recognize that many variations of this approach are possible, using any combination of modulation, packetization protocol and descriptive metadata syntax. Here again, this beacon-based adaptability may be used, where desired, with one or more of the innovations discussed above. Regarding this aspect of the present techniques, it should be noted that not only UHF bands may be utilized in this manner, but VHF, UHF and bondings may be employed across the entirety of the "broadcast" bands.

It should be noted that the present techniques may enable novel business models that are based on the allocation of the available spectrum for broadcasts. That is, one or more entities may obtain rights to control one or more portions of the available spectrum, and license or sell the one or more portions to broadcasters as demand fluctuates. The entities may effectively become or function as clearing houses or managers of those portions of the available spectrum, in a manner similar to the current use of satellite resources. Such management may allow for planned, or dynamic changes in the use of the managed spectrum, which changes may be easily followed and implemented by receivers via the beacon signals and metadata transmitted.

Finally, it should be noted that the present techniques may make use of "out of band" continuous (or periodic, or occasional) transmission of the beacon signals and metadata discussed above. That is, the beacon signal and its data may be transmitted on a frequency that is not an attributed "channel", and thus may be transmitted separate from main or scheduled broadcasts. For example, mobile and fixed transmissions may occur on a particular channel (e.g., channel 36), while the beacon for control of the frequency allocation for the market of broadcasts is transmitted on a different frequency, or where desired, a different channel (e.g., channel 4).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A broadcast method comprising:
    transmitting, via one or more broadcast transmitters, a broadcast signal over a desired radiofrequency ("RF") band, wherein the broadcast signal comprises encoded broadcast media content and encoded return channel information;
    transmitting, via the one or more broadcast transmitters, a beacon signal to a receiver, and the beacon signal identifies one or more modifications to a center frequency, a bandwidth, or a modulation type of the broadcast signal transmission that will be subsequently implemented in a modified broadcast signal;
    transmitting, via the one or more broadcast transmitters, the modified broadcast signal over the desired RF band, wherein the modified broadcast signal is in accordance with the one or more modifications;

transmitting, via the broadcast signal and the one or more broadcast transmitters, the encoded return channel information, wherein the encoded return channel information indicates a return channel;

transmitting a return channel window, a portion of a spectrum, or both, via the one or more broadcast transmitters, to be used by the receiver for the return channel for interaction with the broadcast media content, wherein the portion of the spectrum is based at least in part upon the beacon signal, and wherein the return channel window is spaced apart from another return channel window by a delay; and receiving a return signal via the return channel during the return channel window, over the portion of the spectrum, or both.

2. The method of claim 1, wherein the beacon signal comprises a 100 khz digital signal is broadcast using QPSK modulation and a 7/8 error correcting code.

3. The method of claim 1, wherein the beacon signal comprises data organized into a one-way digital communication protocol.

4. The method of claim 3, wherein the beacon signal comprises data organized into UDP/IP packets.

5. The method of claim 1, wherein the beacon signal identifies one or more modifications to a time value.

6. The method of claim 1, wherein the modulation type comprises BPSK, QPSK, 16- 32- 64- 128- and 256-QAM, 8-VSB, or COFDM.

7. The method of claim 1, wherein the bandwidth comprises a multiple of 10 kHz or 180 kHz resource blocks.

8. The method of claim 4, wherein the bandwidth comprises at least one of 6, 7 and 8 MHz channelizations and the 1.4, 3, 5, 10, 15 and 20 MHz channelizations.

9. The method of claim 1, wherein the beacon signal aggregates metadata for broadcast signals of a plurality of broadcasters.

10. The method of claim 1, wherein the broadcast media content is in accordance with a pre-defined broadcast schedule.

11. The method of claim 1, wherein the broadcast signal is transmitted over a UHF frequency.

12. The method of claim 11, comprising receiving the return signal from the receiver transmitted over a different frequency.

13. A broadcast method comprising:

receiving, from one or more broadcast transmitters, a broadcast signal over a desired radiofrequency ("RF") band, wherein the broadcast signal comprises encoded broadcast media content and encoded return channel information;

receiving, from the one or more broadcast transmitters, a beacon signal at one or more receivers, wherein the beacon signal identifies one or more modifications to a center frequency, a bandwidth, or a modulation type of the broadcast signal that will be subsequently implemented in a modified broadcast signal;

tuning the one or more receivers based on the one or more modifications to receive the modified broadcast signal over a desired radiofrequency band;

receiving, via the broadcast signal and from the one or more broadcast transmitters, the encoded return channel information comprising one or more return channels;

receiving one or more return channel windows, one or more portions of a spectrum, or both, from the one or more broadcast transmitters, wherein each return channel of the one or more return channels is used by a particular receiver of the one or more receivers during a particular return channel window of the one or more return channel windows for interaction with the broadcast media content, wherein the one or more portions of the spectrum are based at least in part upon the beacon signal, and wherein each return channel window of the one or more return channel windows is spaced apart from another return channel window by a delay; and transmitting one or more return signals via the one or more return channels during the one or more return channel windows, over the one or more portions of the spectrum, or both.

14. The broadcast method of claim 1, wherein the return channel window is a time period when the return channel is valid.

15. The broadcast method of claim 1, wherein the return signal identifies viewing data, usage data, or both.

16. The broadcast method of claim 1, wherein the return signal identifies a signal quality.

17. The broadcast method of claim 1, wherein the beacon signal identified a program guide of channels.

18. The broadcast method of claim 1, wherein the receiver comprises a television set, a set-top box, a radio, or other device configured to receive and process the broadcast signal and the beacon signal.

19. The broadcast method of claim 1, wherein the receiver comprises an internal clock configured to synchronize the transmission of the return signal during the return channel window.

20. The broadcast method of claim 13, wherein one or more receivers are configured to receive and decode the return channel information, and wherein the one or more receivers are configured to pass the return channel information to one or more return channel transmitters.

21. The broadcast method of claim 20, wherein the one or more return channel transmitters is configured to transmit the one or more return signals via the one or more return channels during the one or more return channel windows.

22. The broadcast method of claim 13, wherein the one or more return signals identify voting information, polling information, or both.

23. The broadcast method of claim 13, wherein the one or more receivers are configured to automatically detect the beacon signal and stay tuned to a beacon transmitting the beacon signal.

24. The broadcast method of claim 13, wherein the delay is pseudorandom.

* * * * *